US008204905B2

United States Patent
Kuo et al.

(10) Patent No.: US 8,204,905 B2
(45) Date of Patent: Jun. 19, 2012

(54) USE OF DATA PATTERNS FOR RAPID SEARCH OF COMPLEX RULES IN A RULES-BASED SEARCH ENGINE

(75) Inventors: Justin Kuo, Redwood City, CA (US); Ravi Tata, Sunnyvale, CA (US); Manoj Arya, Fremont, CA (US); Justin Lin, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 12/398,396

(22) Filed: Mar. 5, 2009
(Under 37 CFR 1.47)

(65) Prior Publication Data
US 2010/0318567 A1 Dec. 16, 2010

(51) Int. Cl.
*G06F 17/30* (2006.01)
(52) U.S. Cl. ........................................................ 707/780
(58) Field of Classification Search ........... 707/758–780
See application file for complete search history.

(56) References Cited

U.S. PATENT DOCUMENTS

| | | | |
|---|---|---|---|
| 7,031,956 B1 * | 4/2006 | Lee et al. ............................. | 1/1 |
| 7,630,986 B1 * | 12/2009 | Herz et al. .......................... | 1/1 |
| 7,836,010 B2 * | 11/2010 | Hammond et al. ........... | 707/705 |
| 7,856,434 B2 * | 12/2010 | Gluzman Peregrine et al. ............................. | 707/722 |

* cited by examiner

*Primary Examiner* — Fred I Ehichioya
*Assistant Examiner* — Tina Huynh
(74) *Attorney, Agent, or Firm* — Kilpatrick Townsend & Stockton LLP

(57) ABSTRACT

In various embodiments, systems and methods are provided that can facilitate searching for entities, such as rules, that apply to search criteria. The disclosed systems and methods can reduce some of the performance bottlenecks associated with, for example, rules-based search systems by using metadata. The metadata may be generated to reduce the size of information about a set of entities that is required to be searched. In some embodiments, the metadata may represent one or more tuple elements, such as keys and values of keys in key-value pairs.

20 Claims, 13 Drawing Sheets

╭─ 700

╭─ 710  ╭─ 720

| ID | DATA PATTERN |
|----|--------------|
| 1  | CUSTOMER \| PAYMENT TERMS |
| 2  | CUSTOMER \| PAYMENT TERMS \| PRODUCT |
| 3  | PRODUCT \| LIST PRICE |
| 4  | PRODUCT \| SEASONAL DISCOUNT \| CUSTOMER |
| 5  | PRODUCT \| BACK TO SCHOOL DEAL \| CUSTOMER |

| ID | ATTRIBUTE GROUP | DP ID | RULE ID |
|----|-----------------|-------|---------|
| 1  | SAFEWAY \| 2 NET | 1 | A |
| 2  | TARGET \| 2 NET | 1 | B |
| 3  | SAFEWAY \| 1 NET \| SEAFOOD | 2 | C |
| 4  | TARGET \| 1 NET \| MILK | 2 | D |
| 5  | BROOM \| X | 3 | E |
| 6  | SHAMPOO \| Y | 3 | F |
| 7  | SHAMPOO \| 10% \| SAFEWAY | 4 | G |
| 8  | NOTEBOOK \| 5% \| TARGET | 5 | H |

ORDER
    PRODUCT = SHAMPOO
    CUSTOMER = TARGET
    PAYMENT TERMS = 2 NET

| ID | CANDIDATE ATTRIBUTE GROUP | DP ID |
|---|---|---|
| 1 | TARGET \| 2 NET | 1 |
| 2 | TARGET \| 2 NET \| SHAMPOO | 2 |

1110 — ID
1120 — CANDIDATE ATTRIBUTE GROUP
1130 — DP ID

FIG. 11

USE OF DATA PATTERNS FOR RAPID SEARCH OF COMPLEX RULES IN A RULES-BASED SEARCH ENGINE

BACKGROUND OF THE INVENTION

Rules-based systems typically model a problem with fact data. The fact data may take the form of rules and definitions. An inference engine may then process these rules and output search results based on a set of input parameters. Rules-based systems can often be deployed for use by artificial intelligence (AI) and search applications.

One implementation of a rules-based search engine may allow the use of attributes in the form of key-value pairs as the input parameters. In general, an attribute may be satisfied when the key-value pair associated with the attribute exists in the input. Each searchable entity can often have any number of attributes in one-to-many relationships. The search engine may successfully return an entity in the search results when all of the searchable entity's attributes are satisfied in the input.

In a typical relational database implementation, entities and attributes are often stored in separate tables. The attributes table may have a foreign key for each attribute that can be tied to an entity in the entities table. When searching the relational database, these tables can be traversed to find the entities whose attributes that may be satisfied by an input set of attributes. One problem is that with this setup, a search may have to compare each entity's attributes with the input attributes. This approach does not scale well with a large amount of data (e.g., millions of rows) because the amount of processing grows with the number of attributes.

Accordingly, what is desired are improved methods and apparatus for solving the problems discussed above. Additionally, what is desired are improved methods and apparatus for reducing some of the drawbacks discussed above.

BRIEF SUMMARY OF THE INVENTION

In various embodiments, systems and methods are provided that can facilitate searching for entities, such as rules, that apply to search criteria. The disclosed systems and methods can reduce some of the performance bottlenecks associated with, for example, rules-based search systems by using metadata. The metadata may be generated to reduce the size of information about a set of entities that is required to be searched. In some embodiments, the metadata may represent one or more tuple elements, such as keys and values of keys in key-value pairs.

In various embodiments, a first tuple element, such as a key in a key-value pair, may be used to generate data patterns from entities. For example, data patterns can be built for a set of rules having key-value pairs to represent combinations of keys present in the rules. Accordingly, the size of the information to be search may be reduced as entities may have a many-to-one relationship with a given data pattern. In further embodiments, a second tuple element, such as the value of the key in the key-value pair, may be used to generate attribute groups from the entities. For example, attribute groups can be built from the set of rules from the attribute values to represent combinations of values present in the rules.

In various embodiments, search processes may be performed using the data pattern metadata and the attribute group metadata to determine whether one or more entities or rules apply to a given search criteria. Using the data pattern metadata, candidate attribute group metadata may be generated from search criteria using the values in the search criteria that correspond to the keys in the data pattern metadata. A match may then be determined between the candidate attribute group metadata and the attribute group metadata to determine whether one or more entities or rules apply to the search criteria. With this additional metadata, the amount of processing during each search can be reduced.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIG. 7 illustrates a table of metadata indicative of data patterns for the setup rules in FIG. 5 in one embodiment according to the present invention;

FIG. 8 illustrates a table of metadata indicative of attribute groups for the setup rules in FIG. 5 in one embodiment according to the present invention;

FIG. 10 illustrates one example of search criteria for searching the setup rules in FIG. 5 in one embodiment according to the present invention;

FIG. 11 illustrates a set of candidate attribute groups generated based on the search criteria of FIG. 10 in one embodiment according to the present invention.

DETAILED DESCRIPTION OF THE INVENTION

Systems and methods may be described whose implementation may shorten the search process/flow associated with rules-based search systems by performing searches using metadata. The metadata may be used to reduce some of the performance bottlenecks associated with complex searches and searches from large data sets. In general, metadata representing one or more tuple elements can include a unique combination, called a data pattern, of the attribute keys associated with an entity, such as a rule or other object using a key-value pair. Therefore, multiple entities that potentially share a common set of attribute keys may also map to the same data pattern. In various embodiments, the corresponding set of attribute values that can be associated with an entity may make up an attribute group. This additional metadata, which may be stored in tables for data patterns and attribute groups, can be used to enhance search performance as further described below.

Whereas before, the time for search may have been mostly dependent on the number of attributes associated with each entity or object. In some embodiments, using data patterns, the time for processing each search can be primarily dependent on the number of data patterns. Typically, the resulting number of unique data patterns may be as large as the number of entities, which is often smaller than the number of attributes that would otherwise have to be searched. Thus, in some embodiments, methods and systems can capitalize on shared patterns to enhance search performance because if two entities share the same set of attribute keys, then both may likely lead to the same data pattern.

Figure 1:
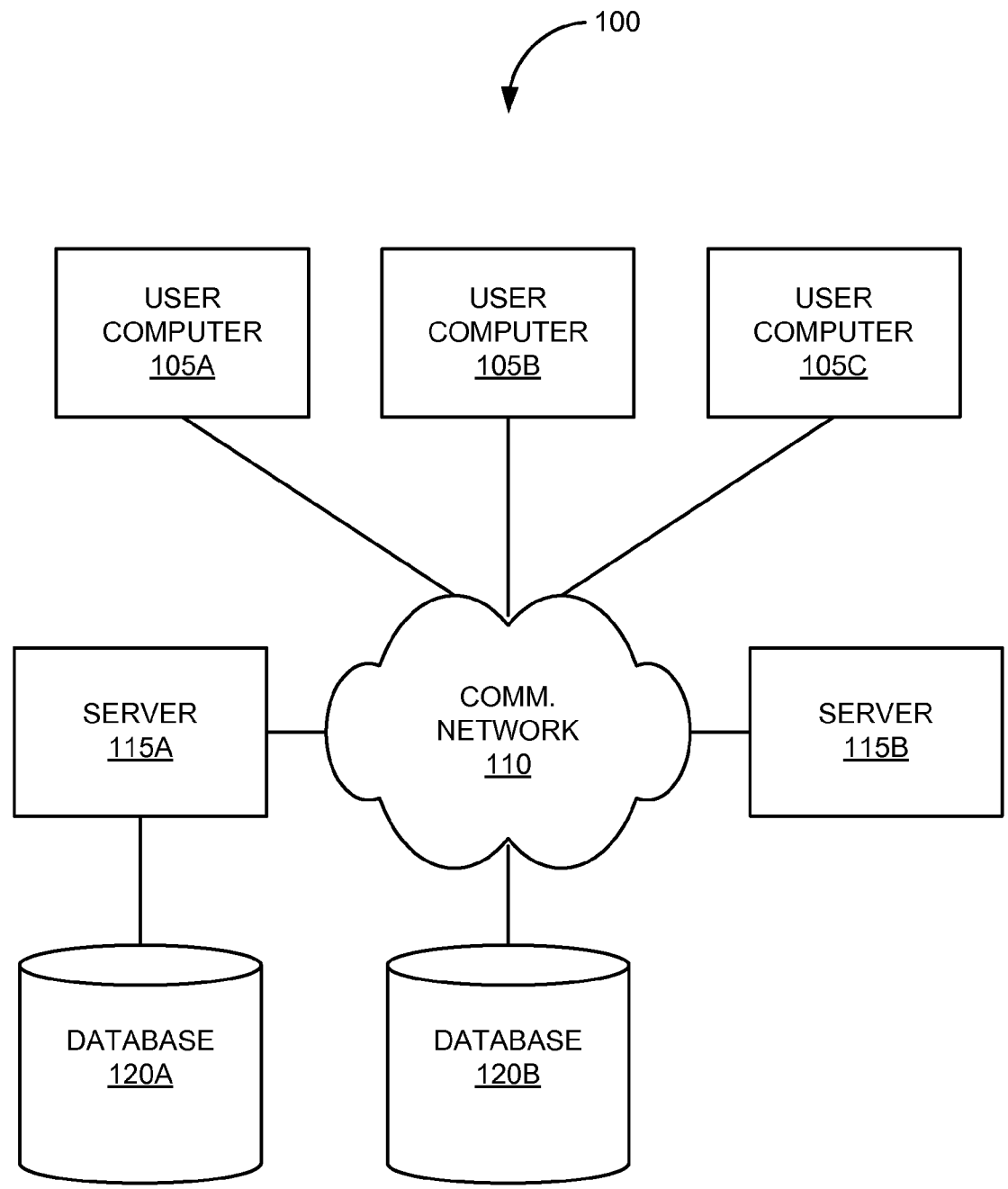
FIG. 1 is a simplified illustration of a system that may incorporate an embodiment of the present invention.

FIG. 1 is a simplified illustration of system 100 that may incorporate an embodiment of the present invention. FIG. 1 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 105 (e.g., computers 105A, 105B, and 105C). User computers 105 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 105 can also have any of a variety of applications, including one or more applications configured to perform methods of the invention, as well as one or more office applications, database client and/or server applications, and web browser applications.

Alternatively, user computers 105 can be any other electronic device, such as a thin-client computer, Internet-enabled mobile telephone, and/or personal digital assistant, capable of communicating via a network (e.g., communications network 110 described below) and/or displaying and navigating web pages or other types of electronic documents. Although the exemplary system 100 is shown with three user computers, any number of user computers or devices can be supported.

Certain embodiments of the invention operate in a networked environment, which can include communications network 110. Communications network 110 can be any type of network familiar to those skilled in the art that can support data communications using any of a variety of commercially-available protocols, including without limitation TCP/IP, SNA, IPX, AppleTalk, and the like. Merely by way of example, communications network 110 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 115 (e.g., computers 115A and 115B). Each of server computers 115 may be configured with an operating system including without limitation any of those discussed above, as well as any commercially-available server operating systems. Each of server computers 115 may also be running one or more applications, which can be configured to provide services to one or more clients (e.g., user computers 105) and/or other servers (e.g., server computers 115).

Merely by way of example, one of server computers 115 may be a web server, which can be used, merely by way of example, to process requests for web pages or other electronic documents from user computers 105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 105 to perform methods of the invention.

Server computers 115, in some embodiments, might include one or more file and or/application servers, which can include one or more applications accessible by a client running on one or more of user computers 105 and/or other server computers 115. Merely by way of example, one or more of server computers 115 can be one or more general purpose computers capable of executing programs or scripts in response to user computers 105 and/or other server computers 115, including without limitation web applications (which might, in some cases, be configured to perform methods of the invention).

Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on one of user computers 105 and/or another of server computer 115.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to one of user computers 105 via a web server (as described above, for example). Similarly, a web server might receive web page requests and/or input data from one of user computers 105 and/or forward the web page requests and/or input data to an application server.

In accordance with further embodiments, one or more of server computers 115 can function as a file server and/or can include one or more of the files necessary to implement methods of the invention incorporated by an application running on one of user computers 105 and/or another of servers 115. Alternatively, as those skilled in the art will appreciate, a file server can include all necessary files, allowing such an application to be invoked remotely by one or more of user computers 105 and/or server computers 115. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 120 (e.g., databases 120A and 120B). The location of the database(s) 120 is discretionary: merely by way of example, database 120A might reside on a storage medium local to (and/or resident in) server computer 115A (and/or one or more of user computers 105). Alternatively, database 120B can be remote from any or all of user computers 105 and server computers 115, so long as it can be in communication (e.g., via communications network 110) with one or more of these. In a particular set of embodiments, databases 120 can reside in a storage-area network ("SAN") familiar to those skilled in the art. (Likewise, any necessary files for performing the functions attributed to user computers 105 and server computers 115 can be stored locally on the respective computer and/or remotely, as appropriate). In one set of embodiments, one or more of databases 120 can be a relational database, such as an Oracle™ database, that is adapted to store, update, and retrieve data in response to SQL-formatted commands. Databases 120 might be controlled and/or maintained by a database server, as described above, for example.

Figure 2:
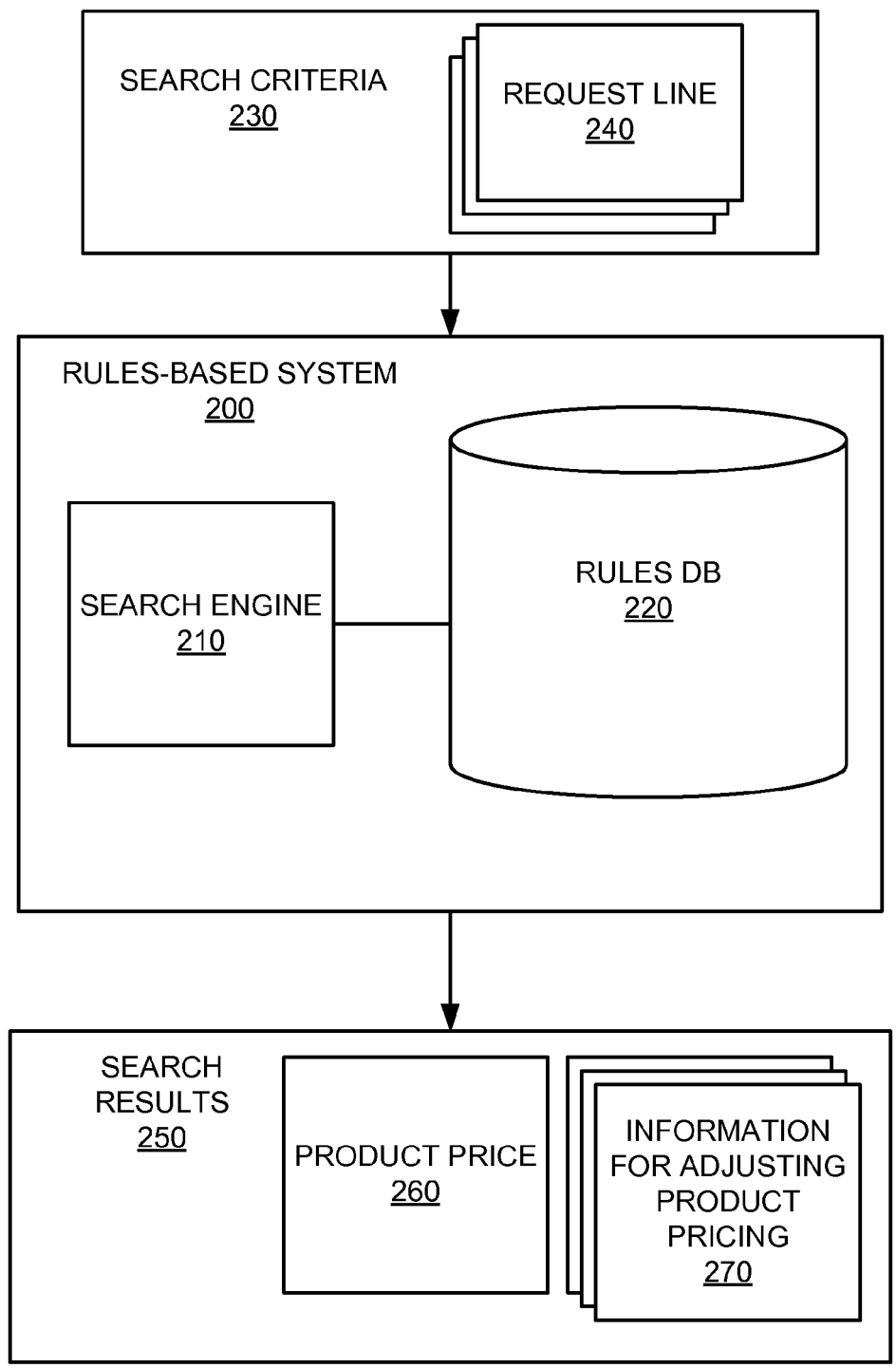
FIG. 2 is a block diagram of a rules-based search system in one embodiment according to the present invention.

FIG. 2 is a block diagram of rules-based search system 200 in one embodiment according to the present invention. Rules-based search system 200 can include search engine 210 and rules database 220.

System 200 of FIG. 2 may be employed for searching any set of entities or objects using rules-based search. In various embodiments, system 200 can be employed as a pricing engine. In these various embodiments, system 200 may include entities or objects indicative of price lists and adjustments that apply to input requests for pricing data. During search, search engine 210 may match request attributes with those of qualifier, pricing, and product attributes in a pricing setup.

Search engine 210 can be any hardware and/or software elements configured to perform searches. Search engine 210 may include one or more interfaces for performing searches, managing searches, or the like. Search engine 210 may receive input from one or more sources. For example, search engine 210 may receive input from a user. In another example, search engine 210 may receive input from one or more applications.

Search engine 210 may perform the searches using input that contains search criteria. Search criteria can be any information that can be understood, interpreted, parsed, read, or like, by search engine 210. In one example, the search criteria may include one or more request lines or modifiers. Request lines or modifies can be any information that includes a set of attributes. Each attribute may be associated with a key-value pair. For example, a key-value pair may be <name><Tom>; "Name"="Tom"; or the like, where 'name' is the key, and 'Tom' is the value associated with the key.

Search engine 210 may perform the searches against rules database 220. Rules database 220 can be any hardware and/or software elements configured to store data. Rules database 220 may store data in the form of rules. In general, a rule can be any set of conditions or attributes. The rule may be satisfied when one, part, or all of the set of conditions are satisfied by one or more criteria. In another example, the rule may be matched when one, part, or all of the set of attributes are identical or substantially identical to one or more elements of search criteria.

Rules database 220 may include any number of data structures to store data. Rules database 220 may include one or more interfaces, APIs, event hooks, triggers, or the like. Rules database 220 may be a flat file, hierarchical database, relational database, or the like. Rules database 220 may include one or more database engines, query engines, management agents, plug-ins, or the like, for facilitating storage and/or retrieval of data. Rules database 220 may be embodied as a standalone machine or device, a virtual machine, a load-balanced machine, a cluster or grid of computers, or the like. Rules database 220 may be located on the same machine as search engine 210 or on separate one or more machines. Rules database 220 may be coupled to search engine 210 physically and/or communicatively using inter-process communications, event busses, messaging buses, parallel or serial interface, network interfaces, one or more communications networks, or the like.

In one example of operation, system 200 can receive search criteria 230. Search criteria 230 can include a request line 240. A request line may be a document, a purchase order, a shipping order, a search input, a query, or the like, and may include information such as elements of a tuple, key-value pairs, or the like. In this example, search criteria 230 includes a set of three request lines. It can be understood that search criteria 230 may include a fewer number of requests lines or a greater number of request lines that those shown in FIG. 2. Search criteria 230 may include other information (now shown) that may or may not be used by system 200.

In this example of operation, search engine 210 can receive search criteria 230. Search engine 210 may use search criteria 230 to perform one or more searches using rules database 220. For example, search engine 210 may perform searches for each request line 240 that may be included in search criteria 230 to determine which rules in rules database 220 are satisfied by request line 240, match elements of request line 240, or otherwise apply to request line 240. In another example, search engine 210 may perform a single search using each request line 240 in the set that may be included in search criteria 230.

In various embodiments, metadata may be generated that facilitates searching of rules in rules database 220 by search engine 210. For example, a data pattern may be generated by identifying attribute keys of each rule in rules database 220. As a likelihood exists that more than one rule shares the same set of attribute keys, a single data pattern may be used to represent multiple rules. In another example, an attribute group may be generated by identifying the attribute values of the attribute keys of each rule in rules database 220. Each attribute group may correspond to its individual rule. Therefore, a list of potential or candidate attribute groups may be generated for each input request (e.g., search criteria 230) by using the data patterns for the rules. In other words, only combinations of attribute value need be to be create for those attribute keys known to exists in the rules. A match may be determined between the candidate attribute group and an attribute group of a rule in rules database 220 to identify whether the rule applies or is otherwise satisfied.

In response to searches, search engine 210 may receive information about entities, such as rules stored in rules database 220, to generate search results 250. For example, each entity or object whose attribute group matches may be returned by the search. The information received from rules database 220 can be any information associated with data stored in rules database 220. For example, rules database 220 may return information related to entities or objects stored in rules database 220. In another example, rules database 220 may return the entities or objects themselves. The information from rules database 220 may be processed by one or more intermediary applications or processes (not shown) before being received by search engine 210.

In this example, search engine 210 generates search results 250 to include product price 260 and information for adjusting product pricing 270. Product price 260 can be any information that provides a price associated with a product. Information for adjusting product pricing 270 can include any information that may be used to determine adjustments to a price associated with a product. It can be understood that while the specific examples describe product pricing, other types of search results may be generated from information stored in rules database 220. While specific examples may describe one or more embodiments with respect to products, and determining product pricing, the exemplary embodiments should be viewed as examples, and are not intended to limit the scope of this disclosure.

In various embodiments, as discussed above, system 200 can shorten the search process/flow using metadata, such as data patterns and attribute groups. In general, a data pattern can be any information representing one or more tuple elements, such as a unique combination of attribute keys associated with an entity. The number of data patterns may be smaller than the number of entities as multiple entities that share a common set of attribute keys can map to the same data pattern. The corresponding sequence of attribute values from the attribute keys associated with the entity typically form a uniquely identifying attribute group.

In further embodiments, system 200 uses the metadata to represent the data patterns and attribute groups of entities or objects. System 200 may store the metadata as one or more tables (e.g., in rules database 220) for the data patterns and attribute groups. Each entity may have a data pattern in a many-to-one relationship, thus, system 200 may provide that there is a foreign key in the entity or object table pointing to the data pattern table. Each entity also may have a corresponding attribute group in a one-to-one relationship, thus, system 200 may provide that there is a foreign key in the attribute groups table pointing to the entity table.

Accordingly, in various embodiments, instead of matching attributes of all of the entities or objects with search criteria, system 200 may perform a search during a search process that may matches attribute groups based on existing patterns. Thus, timing for the search process can be reduced because system 200 may not have to search one-by-one the attributes of all of the entities or objects to find possible matches.

Without the additional metadata in the form of data patterns and attribute groups, the time for search can be dependent on the number of attributes. Using data patterns, the time can be primarily dependent on the number of data patterns. In complex setups, the number of unique data patterns can be as large as the number of entities, which is can often be still smaller than the number of attributes for the entities. Furthermore, even in simpler setups, when patterns may shared among entities, the fewer number of unique patterns can further reduces the amount of processing. In this way, system 200 may enables searching to scale with the complexity of the setup, rather than the size.

Figure 3:
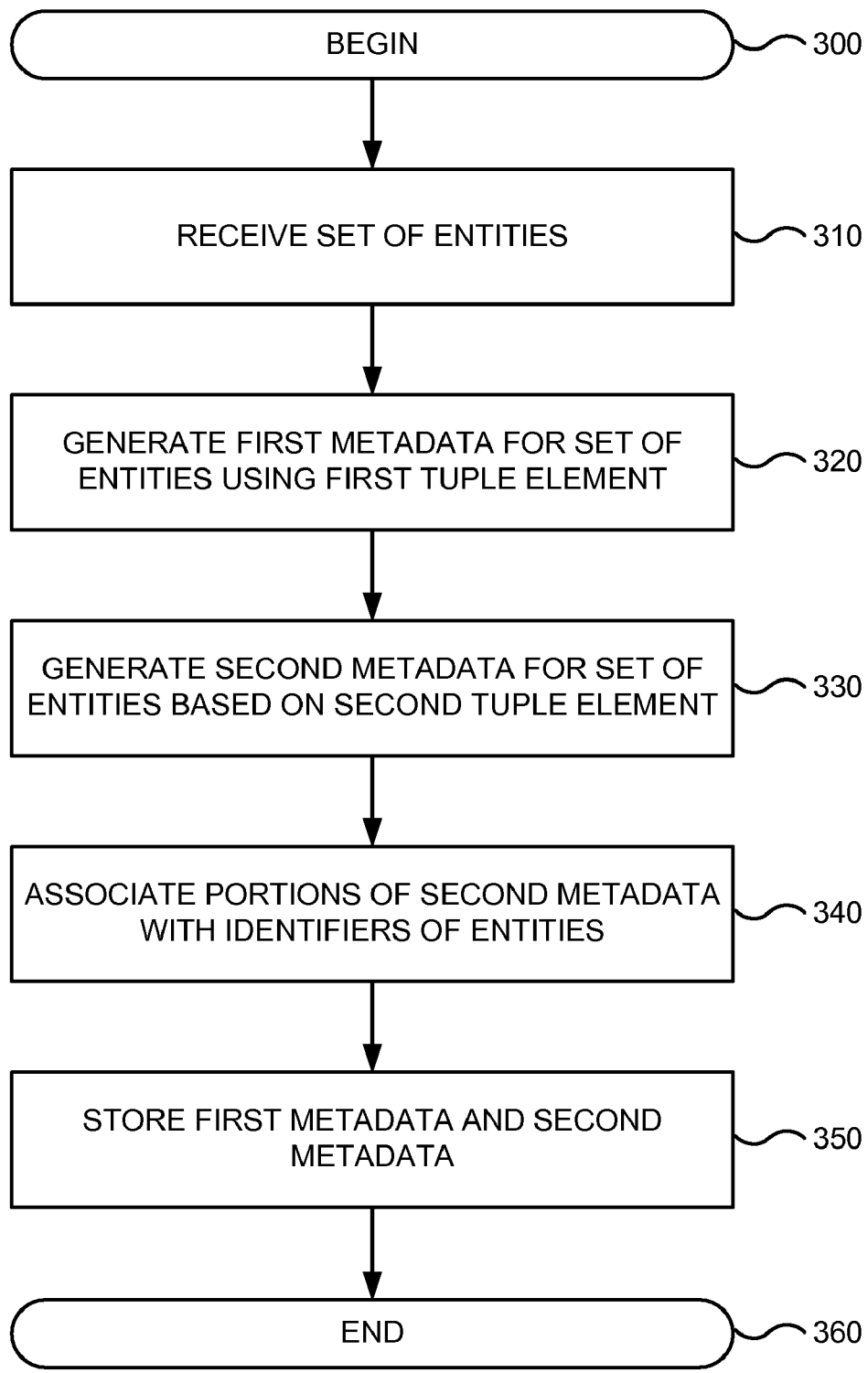
FIG. 3 is a flowchart of a method for generating metadata for facilitating searching in one embodiment according to the present invention.

FIG. 3 is a flowchart of a method for generating data patterns for rapid search in one embodiment according to the present invention. The processing depicted in FIG. 3 may be performed by software modules (e.g., instructions or code) executed by a processor of system 200, by hardware modules of system 200, or combinations thereof. FIG. 3 begins in step 300.

In step 310, a set of entities are received. An entity can include objects, rules, etc. As discussed above, an entity may include a rule that can be any set of principles, conditions, attributes, logic, procedures, data, or the like. In some embodiments, each rule may include a name, a description, and a set of key-value pairs. A rule can also be indicative of or otherwise define an action to be performed. For example, a rule can specify a set of actions to be performed in the event that one or more of conditions associated with the rule are satisfied. In another example, a rule can map to one or more actions that may be performed when a match may be found with one, part, or all of the key-value pairs associated with the rule.

Figure 5:
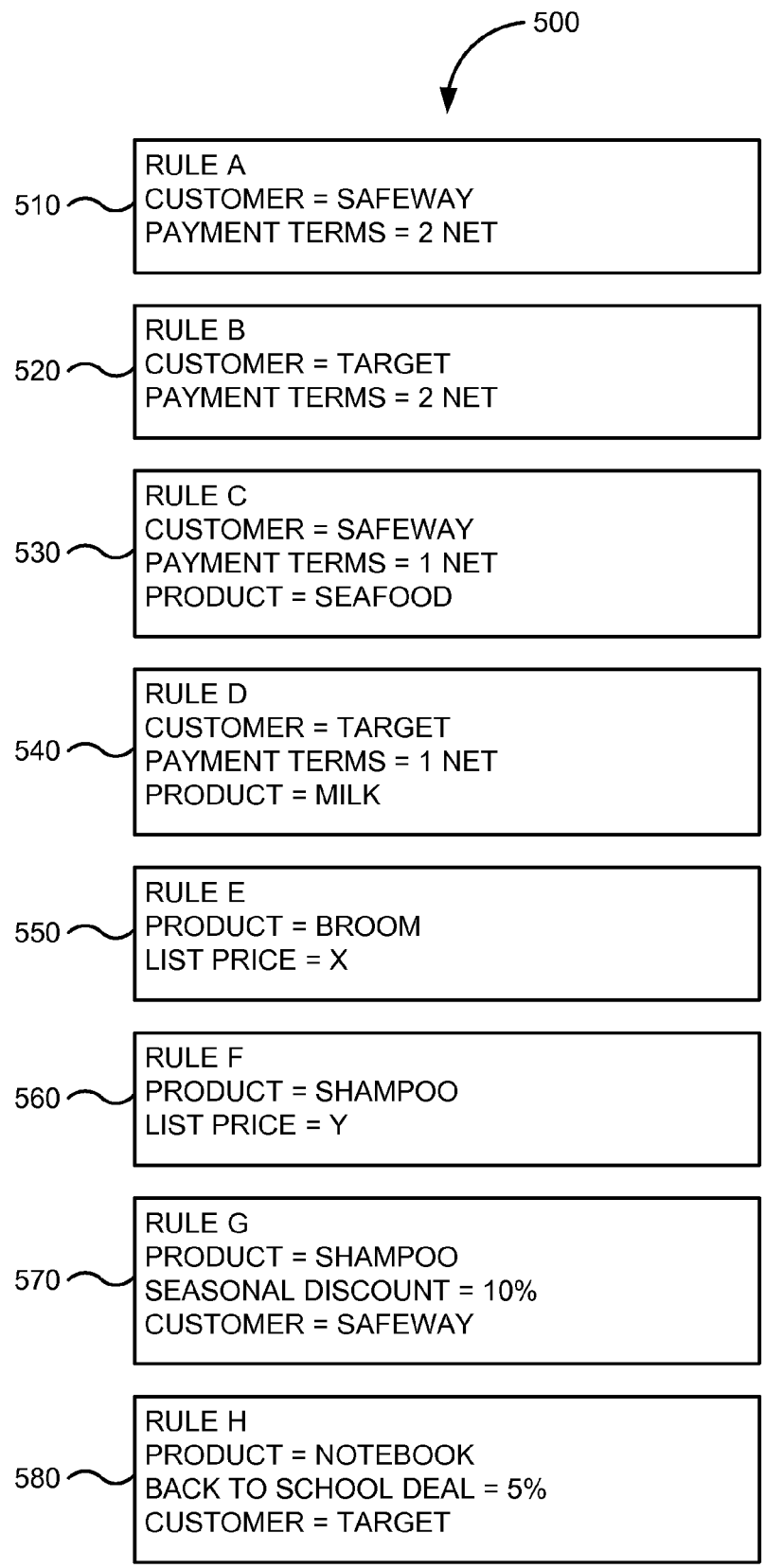
FIG. 5 illustrates a set of setup rules in one embodiment according to the present invention.

FIG. 5 illustrates setup rules 500 in one embodiment according to the present invention. Setup rules 500 may be expressed using plain text, markup languages (e.g., the Extensible Markup Language XML or the HyperText Markup Language HMTL), binary format, or the like. In this example, setup rules 500 include rules 510, 520, 530, 540, 550, 560, 570, and 580. Each rule in setup rules 500 may include more or less information than found in the following examples.

Rules 510, 520, 530, 540, 550, 560, 570, and 580 can include a name and a set of attributes (e.g., key-value pairs). Rule 510 includes the name "RULE A" and the attributes of {CUSTOMER=SAFEWAY} and {PAYMENT TERMS=2 NET}. Rule 520 includes the name "RULE B" and the attributes of {CUSTOMER=TARGET} and {PAYMENT TERMS=2 NET}. Rule 530 includes the name "RULE C" and the attributes of {CUSTOMER=SAFEWAY}, {PAYMENT TERMS=1 NET}, and {PRODUCT=SEAFOOD}. Rule 540 includes the name "RULE D" and the attributes of {CUSTOMER=TARGET}, {PAYMENT TERMS=1 NET}, and {PRODUCT=MILK}. Rule 550 includes the name "RULE E" and the attributes of {PRODUCT=BROOM} and {LIST PRICE=X}. Rule 560 includes the name "RULE F" and the attributes of {PRODUCT=SHAMPOO} and {LIST PRICE=Y}. Rule 570 includes the name "RULE G" and the attributes of {PRODUCT=SHAMPOO}, {SEASONAL DISCOUNT=10%}, and {CUSTOMER=SAFEWAY}. Rule 580 includes the name "RULE H" and the attributes of {PRODUCT=NOTEBOOK}, {BACK TO SCHOOL DEAL=5%}, and {CUSTOMER=TARGET}.

Returning to FIG. 3, in step 320, first metadata is generated for the set of entities using a first tuple element. In general, the first metadata data pattern can be any list, sequence, pattern, data structure, or the like, that represents a set of elements associated with the first tuple element. The first metadata can take any number of forms for representing data. Some forms may be convenient for storage, retrieval, indexing, transmission, or the like. In one example, a data pattern may be built or created for rule 510 of FIG. 5 using the attribute keys of <CUSTOMER> and <PAYMENT TERMS> as the first tuple element of a key-value pair. Another example of a method for building a data pattern is discussed further with respect to FIGS. 6A and 6B.

Identifiers can be associated with the first metadata. An identifier can be any information, such as an index, hash, pointer, unique or semi-unique reference, or the like. In some embodiment, the first metadata can be stored as data patterns in tables of a database. One or more database mechanisms may provide an identifier associated with the data pattern. In another example, a lookup table may be used to provide an identifier associated with a data pattern.

In step 330, second metadata is generated for the set of entities based on a second tuple element. In general, the second metadata can be any list, sequence, group, data structure, or the like, that represents a set of elements associated with a second tuple element. The second metadata can take any number of forms for representing data. Some forms may be convenient for storage, retrieval, indexing, transmission, or the like. In one example, an attribute group may be built from rule 510 of FIG. 5 using attribute values of <SAFEWAY> for the attribute key <CUSTOMER> and <2 NET> for the attribute key <PAYMENT TERMS>. Another example of a method for building an attribute group is discussed further with respect to FIGS. 6A and 6B.

In step 340, portions of the second metadata is associated with identifiers for entities in the set of entities. For example, a portion of the second metadata may be linked or otherwise reference a given rule in rules database 220. In step 360, the first metadata and the second metadata is stored. In various embodiments, the first metadata and second metadata may be stored as tables in a database for a set of data patterns and a corresponding set of attribute groups. FIG. 3 ends in step 360.

Accordingly, with the additional metadata, such as of the data patterns and attribute groups, the amount of processing required by system 200 during search can be reduced. By using data patterns built from the set of rules for searches, for example, the time required by system 200 can be primarily dependent on the number of data patterns to be searched rather than the number of rules and their associated attributes. Thus, embodiments may enable searching to scale with the complexity of the setup, rather than the size of the data set.

Figure 4:
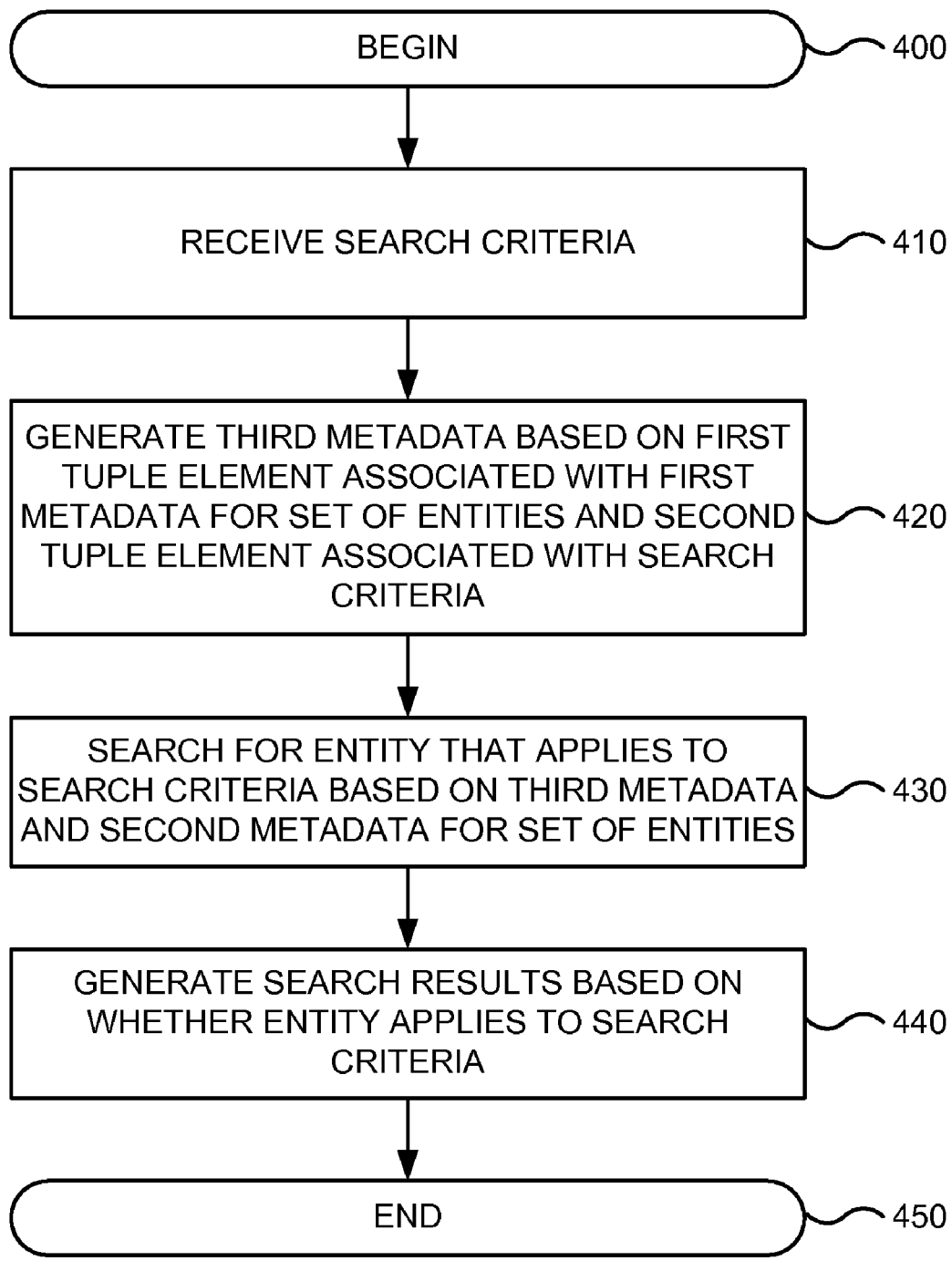
FIG. 4 is a flowchart of a method for searching using the metadata in one embodiment according to the present invention.

FIG. 4 is a flowchart of a method for searching using the metadata in one embodiment according to the present invention. FIG. 4 begins in step 400. In step 410, search criteria is receive.

In step 420, third metadata is generated based on the first metadata generated in FIG. 3 for the set of entities and a second tuple element associated with the search criteria. For example, for each data pattern a set of possible or candidate attribute groups may be generated using the keys in the data patterns and corresponding attribute values taken from the search criteria. One example of a method for building candidate attribute groups is discussed further with respect to FIGS. 9A and 9B.

In step 430, a search is performed for an entity that applies to the search criteria based on the third metadata and the second metadata generated in FIG. 3. For example, each attribute group from the rules may be searched to determine whether a match exists with the candidate attribute groups from the search criteria. In step 440, search results are generated based on whether an entity applies to the search criteria. FIG. 4 ends in step 450.

Figure 6A:
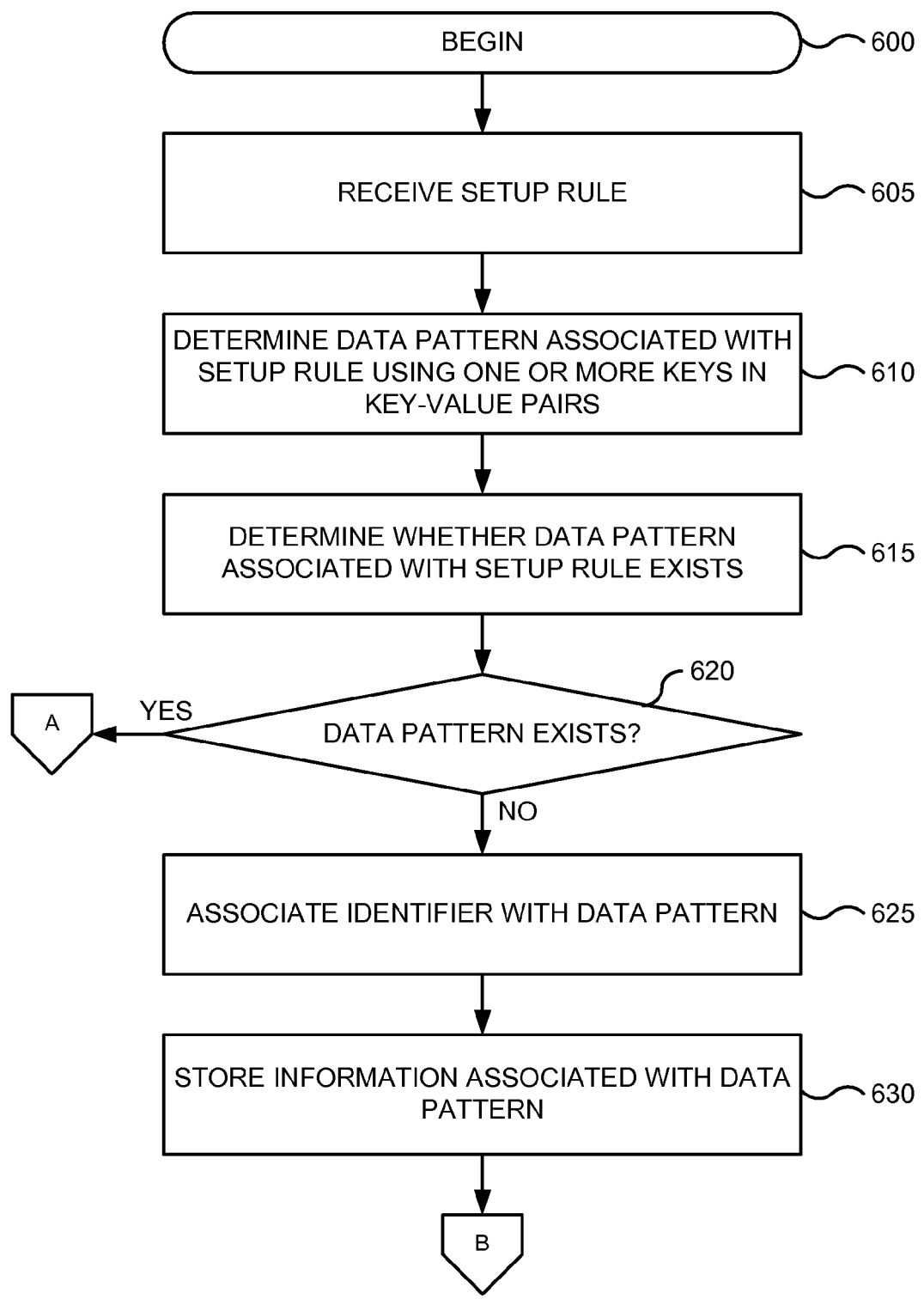
FIGS. 6A and 6B are a flowchart of a method for generating data pattern metadata from setup rules for facilitating searching in one embodiment according to the present invention.
Figure 6B:
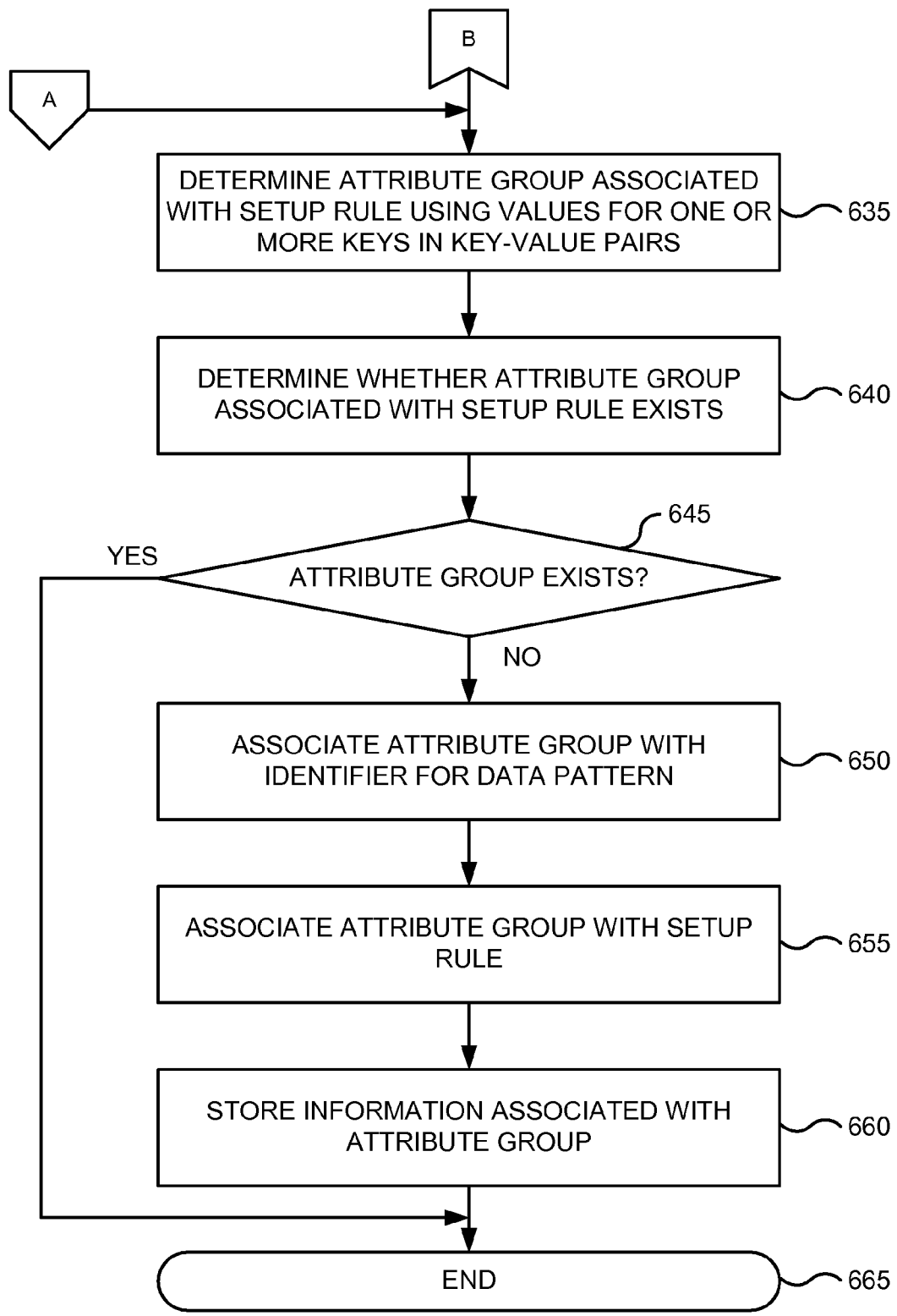

FIGS. 6A and 6B are a flowchart of a method for generating data pattern metadata from setup rules for facilitating searching in one embodiment according to the present invention. FIG. 6A begins in step 600.

In step 605, a setup rule is received. The setup rule may be any entity that can include any number of tuple elements, such as attributes in the form of key-value pairs. The setup rule may also include other information that may or may not be used for searching by system 200. For example, system 200 may return information associated with the setup rule to one or more applications as search results for subsequent processing by the one or more applications. In one example, a user or administrator may interact with a command line or graphical user interface associated with system 200 of FIG. 2 to input rule 610 of FIG. 6 for storage into rules database 220. In another example, the setup rule may be provided, uploaded, downloaded, or otherwise received individually or in conjunction with one or more other setup rules.

In step 610, a data pattern associated with the setup rule is determined. In various embodiments, a data pattern can be determined as a listing or sequence of attribute keys associated with the setup rule. The listing or sequence of attribute keys may be ordered, un-order, normalized, filtered, or the like. A data pattern may be represented by a set, and array, a stack, a queue, a linked list, a tree, a vector, a table row, a table column, or the like. In one example, a data pattern for rule 510 of FIG. 5 can be the set of attribute keys, such as [CUSTOMER|PAYMENT TERMS].

In step 615, a determination is made whether the data pattern associated with the setup rule exists. As discussed above, entities may have a many-to-one relationships with a given data pattern. If no other setup rules have been initialized that have the same data pattern, no exactly matching data pattern may exist. If another setup rule has been initialized or processed that maps to the same data pattern (e.g., because two or more rules share the same set of attribute keys), a data pattern should already exist thereby allowing the data set of searchable items to be reduced. In various embodiments, metadata may be used to track a set of data patterns created or built from entities or objects in a database. The metadata may be embodied as one or more data structures, such as database tables, lookup tables, linked lists, vectors, hash tables, or the like.

In step 620, if a determination is reached that the data pattern associated with the setup rule does exist, the processing continues via reference "A" in FIG. 6A to reference "A" in FIG. 6B, and will be discussed in further detail below. If a determination is reached in step 620 that the data pattern associated with the setup rule does not exist, the processing continues in step 625 of FIG. 6A.

In step 625, an identifier is associated with the data pattern. The identifier can be any set of numbers, characters, symbols, or the like. The identifier may be an index, data structures, hash bucket, or the like that maps, points to, or otherwise is associated with the data pattern. In step 630, information associated with the data pattern is stored. For example, metadata representing the data pattern may be stored in a data pattern table of a relational database. In various embodiments, since each entity or object (e.g., the setup rule) may have a data pattern in a many-to-one relationship, a foreign key may be placed in an entity table. The foreign key may point to the data pattern table for the corresponding data pattern.

The processing continues via reference "B" in FIG. 6A to reference "B" in FIG. 6B. Referring now to FIG. 6B, the process continues via both references "A" and "B" in step 635.

In step 635, an attribute group associated with the setup rule is determined. In various embodiments, an attribute group can be determined as a listing or sequence of values associated with the attribute keys of the setup rule. The ordering, un-ordering, filtering, or the like, of the listing or sequence of attribute values may correspond to that of the attribute keys. An attribute group may be represented by a set, and array, a stack, a queue, a linked list, a tree, a vector, a table row, a table column, or the like. In one example, an attribute group for rule 510 of FIG. 5 can be the set of attribute values, such as [SAFEWAY|2 NET].

In step 640, a determination is made whether the attribute group associated with the setup rule exists. As discussed above, each entity can also have a corresponding attribute group in a one-to-one relationship. If no other setup rules have been initialized that have the same attribute group, no exactly or substantially matching attribute groups may exist. If another setup rule has been initialized or processed that maps to the same attribute group (e.g., because two or more rules share the same set of attribute values), an attribute group may already exist. In various embodiments, metadata may be used to track a set of attribute groups created or built from entities or objects in a database. The metadata may be embodied as one or more data structures, such as database tables, lookup tables, linked lists, vectors, hash tables, or other format as previously discussed.

In step 645, if a determination is reached that the attribute group associated with the setup rule does exist, the processing continues in step 665. If a determination is reached that the attribute group associated with setup rule does not exist, in step 650, the attribute group is associated with the identifier for the corresponding data pattern determined previously.

In step 655, the attribute group is associated with the setup rule. For example, in various embodiments, the metadata or a portion thereof for the attribute groups may be updated to point to, map to, or otherwise reference the setup rule. In step 660, information associated with the attribute group is stored. For example, metadata representing the attribute group may be stored in an attribute group table of a relational database. FIG. 6B ends in step 665.

FIG. 7 illustrates table 700 of metadata indicative of data patterns for setup rules 500 in FIG. 5 in one embodiment according to the present invention. Table 700 includes column 710 entitled "ID" and column 720 entitled "Data Pattern." One or more of setup rules 500 of FIG. 5 can map to one of the rows of table 700.

In this example, the attribute keys of rules 510 and 520 may map to the row in table 700 with the "ID" of 1 and the "Data Pattern" of [CUSTOMER|PAYMENT TERMS]. The attribute keys of rules 530 and 540 may map to the row in table 700 with the "ID" of 2 and the "Data Pattern" of [CUSTOMER|PAYMENT TERMS|PRODUCT]. The attribute keys of rules 550 and 560 may map to the row in table 700 with the "ID" of 3 and the "Data Pattern" of [PRODUCT|LIST PRICE]. The attribute keys of rule 570 may map to the row in table 700 with the "ID" of 4 and the "Data Pattern" of [PRODUCT|SEASONAL DISCOUNT|CUSTOMER]. The attribute keys of rule 580 may map to the row in table 700 with the "ID" of 5 and the "Data Pattern" of [PRODUCT|BACK TO SCHOOL DEAL|CUSTOMER].

FIG. 8 illustrates table 800 of metadata indicative of attribute groups for setup rules 500 in FIG. 5 in one embodiment according to the present invention. Table 800 includes column 810 entitled "ID," a column 820 entitled "Attribute Group," a column 830 entitled "DP ID," and a column 840 entitled "RULE ID." Each of setup rules 500 of FIG. 5 can map to one of the rows of table 800.

In this example, the values corresponding to the attribute keys of rule 510 may map to the row in table 800 with the "ID" of 1, the "ATTRIBUTE GROUP" of [SAFEWAY|2 NET], the "DP ID" (the corresponding data pattern) of 1, and the "RULE ID" of "A" (e.g., corresponding to the name or other identifier for rule 510). The attribute values of rule 520 may map to the row in table 800 with the "ID" of 2, the "ATTRIBUTE GROUP" of [TARGET|2 NET], the "DP ID" of 1, and the "RULE ID" of "B". The attribute values of rule 530 may map to the row in table 800 with the "ID" of 3, the "ATTRIBUTE GROUP" of [SAFEWAY|1 NET|SEAFOOD], the "DP ID" of 2, and the "RULE ID" of "C".

The attribute values of rule 540 may map to the row in table 800 with the "ID" of 4, the "ATTRIBUTE GROUP" of [TARGET|1 NET|MILK], the "DP ID" of 2, and the "RULE ID" of "D". The attribute values of rule 550 may map to the row in table 800 with the "ID" of 5, the "ATTRIBUTE GROUP" of [BROOM|X], the "DP ID" of 3, and the "RULE ID" of "E". The attribute values of rule 560 may map to the row in table 800 with the "ID" of 6, the "ATTRIBUTE GROUP" of [SHAMPOO|Y], the "DP ID" of 3, and the "RULE ID" of "F". The attribute values of rule 570 may map to the row in table 800 with the "ID" of 7, the "ATTRIBUTE GROUP" of [SHAMPOO|10%|SAFEWAY], the "DP ID" of 4, and the "RULE ID" of "G". The attribute values of rule 580 may map to the row in table 800 with the "ID" of 8, the "ATTRIBUTE GROUP" of [NOTEBOOK|8% TARGET], the "DP ID" of 5, and the "RULE ID" of "H".

In various embodiments, rather than performing searches to match or identify all of the attributes of setup rules, system 200 may perform search processes using candidate attribute groups based on existing data patterns. With this additional metadata, the amount of processing during each search can be reduced. Whereas before, the time for search may have been mostly dependent on the number of attributes associated with each entity or object. In some embodiments, using data patterns, the time for processing each search can be primarily dependent on the number of data patterns. Typically, the resulting number of unique data patterns may be as large as the number of entities, which is often smaller than the number of attributes that would otherwise have to be searched.

Figure 9A:
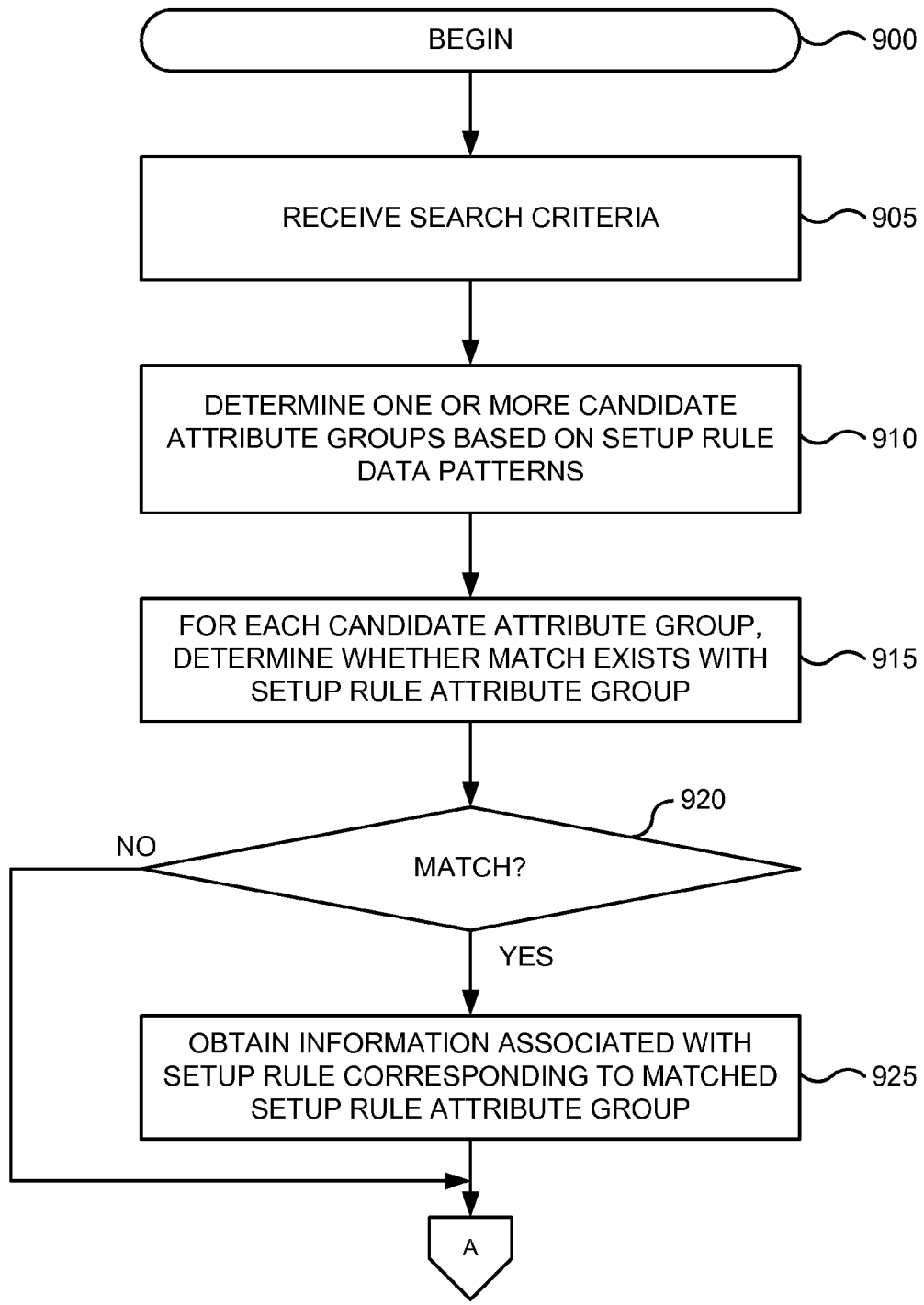
FIGS. 9A and 9B are a flowchart of a method for searching the setup rules in FIG. 5 in one embodiment according to the present invention.
Figure 9B:
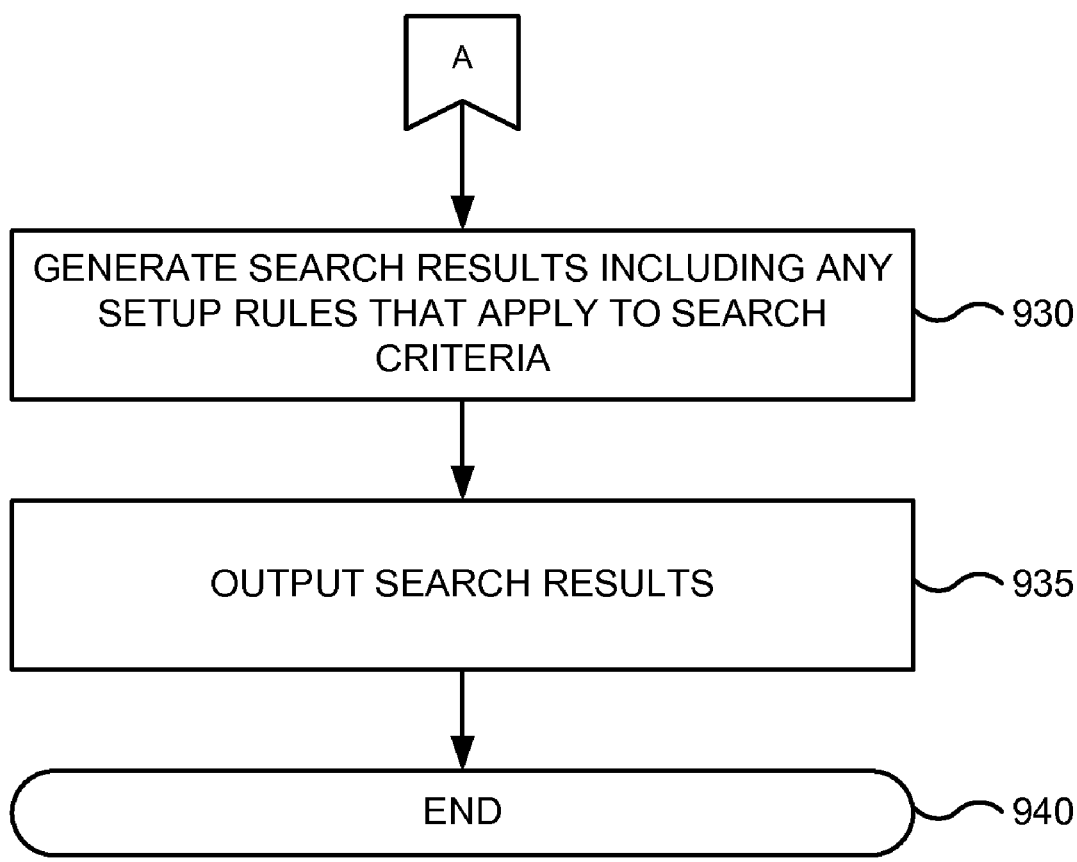

FIGS. 9A and 9B are a flowchart of a method for searching the setup rules in FIG. 5 in one embodiment according to the present invention. FIG. 9A begins in step 900.

In step 905, search criteria is received. For example, search input may be received as a user or customer requests a particular product from a vendor's website. In another example, a manufacture may receive a purchase order or request for proposal from a customer as the search criteria. The search criteria may include information or input, such as data associated with objects, products, users, coupons or discounts, destinations, or the like.

FIG. 10 illustrates one example of search criteria for searching the setup rules in FIG. 5 in one embodiment according to the present invention. In this example, a customer order or pricing request is received having the following content:

ORDER
PRODUCT=SHAMPOO
CUSTOMER=TARGET
PAYMENT TERMS=2 NET

Referring to FIG. 9A, in step 910, one or more candidate attribute groups are determined based on the search criteria and the setup rule data patterns generated in FIGS. 8A and 8B. For example, for each setup data pattern in FIG. 7, a candidate attribute group may be generated from search criteria 1000. Continuing the above example of the customer order or pricing request of FIG. 10, for the data pattern of table 700 having ID="1", a candidate attribute group may be generated from the search criteria by determining whether the attribute keys of [CUSTOMER|PAYMENT TERMS] have corresponding attribute values in search criteria 1000. In this example, the candidate attribute group of [TARGET|2 NET] may be generated from the search criteria using the data pattern of table 700 having ID="1."

FIG. 11 illustrates a set of possible candidate attribute groups generated based on search criteria 1000 of FIG. 10 in one embodiment according to the present invention. Table 1100 includes column 1110 entitled "ID," column 1120 entitled "Candidate Attribute Group," and column 1130 entitled "DP ID." In this example, for rule 510 of FIG. 5, a candidate attribute group may be generated and stored in the row in table 1100 with the "ID" of 1 and the "Candidate Attribute Group" of [TARGET|2 NET] corresponding to the attribute keys [CUSTOMER|PAYMENT TERMS]. For rule 520, a candidate attribute group may be generated and stored in the row in table 1100 with the "ID" of 2 and the "Candidate Attribute Group" of [TARGET|2 NET|SHAMPOO] corresponding to the attribute keys of [CUSTOMER|PAYMENT TERMS|PRODUCT]. Rules 530, 540, 550, 560, 570, and 580 may not generate any possible candidate attribute groups as the attribute keys of the rules may not have corresponding attribute values in search criteria 1000.

Referring again to FIG. 9A, in step 915, a determination is made, for each possible candidate attribute group, whether a candidate attribute group matches one or more setup rule attribute groups. In various embodiments, a search may be performed to determine whether any of the entries in table 800 of FIG. 8 have attribute groups in column 820 that match the candidate attribute group. In step 920, if a determination is made that the candidate attribute does not match any of the setup rule attribute group, the processing continues via reference "A" in FIG. 9A to reference "A" in FIG. 9B, which will be discussed in more detail further below.

In step 920, if a determination is made that the candidate attribute group does match one or more of the setup rules attribute groups, in step 925, information associated with the setup rule corresponding to the matched setup rule attribute group. For example, a search may be performed which indicates that the candidate attribute group [TARGET|2 NET] matches the setup rule attribute group in table 800 of FIG. 8 whose ID="2." The RULE ID of the matched row may be retrieved indicated that rule 520 of FIG. 5 having the name "B"

Referring to FIG. 9B, in step 930, search results are generated including any setup rules that apply to the search criteria. In step 935, the search results are output. For example, the search results may be output for storage, displayed to a user, transmitted to one or more applications for further processing, or the like. FIG. 9B ends in step 945.

Accordingly, in various embodiments, the above systems and methods may shorten the search process/flow associated with rules-based search systems by performing searches using metadata. The metadata may be used to reduce some of the performance bottlenecks associated with complex searches and searches from large data sets.

Figure 12:
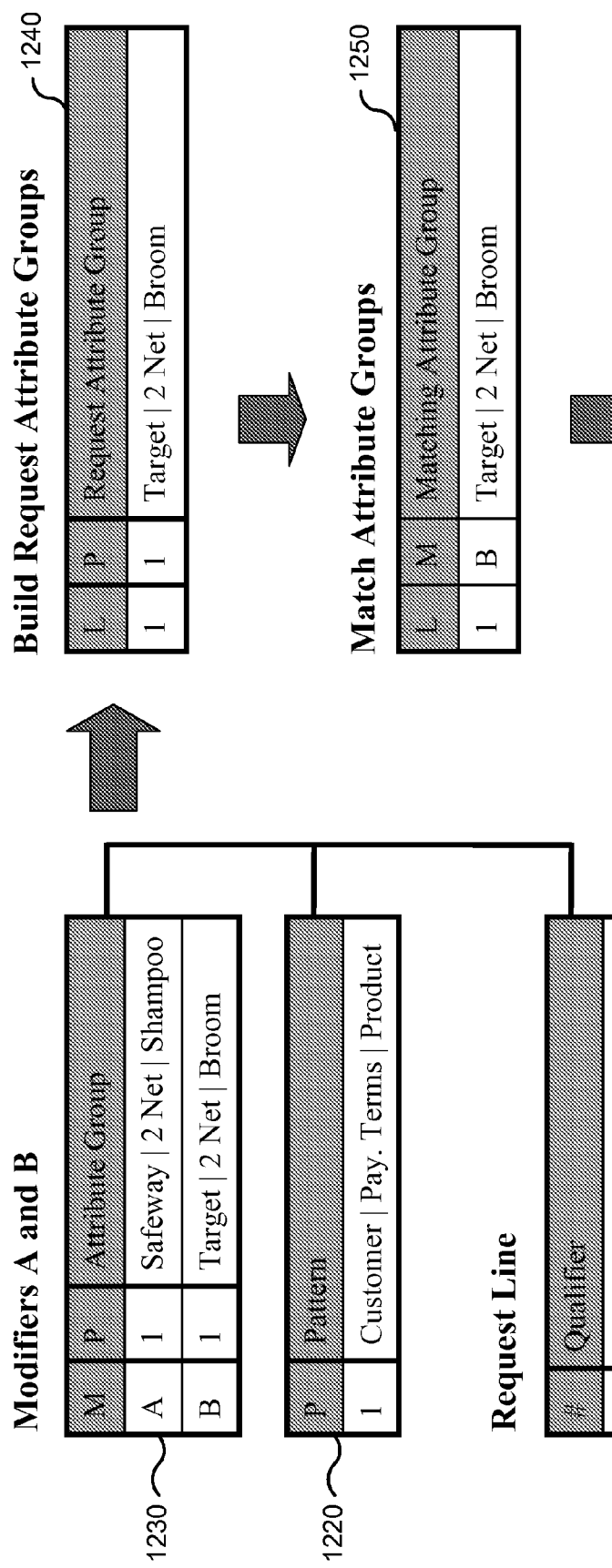
FIG. 12 illustrates another example of a method for rapid search using metadata in one embodiment according to the present invention.

FIG. 12 illustrates another example of a method for rapid search using metadata in one embodiment according to the present invention. In this example, request line 1210 is received having the key-value pairs of [CUSTOMER=TARGET], [PAYMENT TERMS=2 NET], and [PRODUCT=BROOM]. Data pattern 1220 having the key pattern of [CUSTOMER|PAYMENT TERMS|PRODUCT] is used to generate possible candidate attribute groups from request line 1210.

Attribute groups 1230 associated with rules or modifiers (e.g., modifiers A and B) may be searched to determine matches with candidate attribute groups built from request line 1210 using data pattern 1220. For example, candidate attribute group 1240 may be build to include the values [TARGET|2 NET|BROOM] for the attributes in request line 1210 that correspond to the keys in data pattern 1220. A search may be performed to attempt to match the attribute values of candidate attribute group 1240 to values in attribute groups 1230.

A matching attribute group 1250 may be found indicating that rule or modifier B applies to request line 1210. Information 1260 may be generating indicating that rule or modifier B applies to request line 1210.

Figure 13:
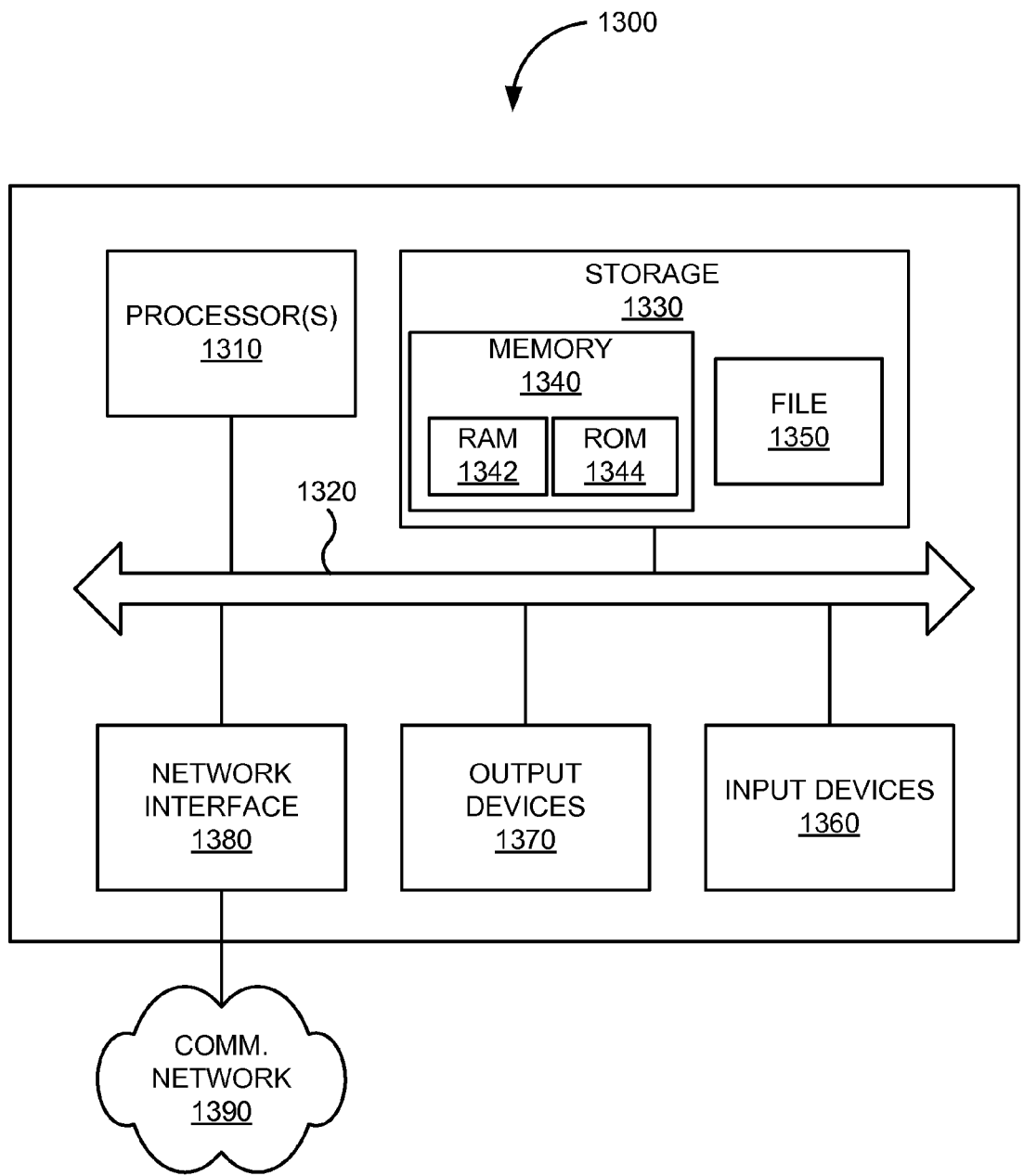
FIG. 13 is a simplified block diagram of a computer system that may be used to practice embodiments of the present invention.

FIG. 13 is a simplified block diagram of computer system 1300 that may be used to practice embodiments of the present invention. As shown in FIG. 13, computer system 1300 includes processor 1310 that communicates with a number of peripheral devices via bus subsystem 1320. These peripheral devices may include storage subsystem 1330, comprising memory subsystem 1340 and file storage subsystem 1350, input devices 1360, output devices 1370, and network interface subsystem 1380.

Bus subsystem 1320 provides a mechanism for letting the various components and subsystems of computer system 1300 communicate with each other as intended. Although bus subsystem 1320 is shown schematically as a single bus, alternative embodiments of the bus subsystem may utilize multiple busses.

Storage subsystem 1330 may be configured to store the basic programming and data constructs that provide the functionality of the present invention. Software (code modules or instructions) that provides the functionality of the present invention may be stored in storage subsystem 1330. These software modules or instructions may be executed by processor(s) 1310. Storage subsystem 1330 may also provide a repository for storing data used in accordance with the present invention. Storage subsystem 1330 may comprise memory subsystem 1340 and file/disk storage subsystem 1350.

Memory subsystem 1340 may include a number of memories including a main random access memory (RAM) 1342 for storage of instructions and data during program execution and a read only memory (ROM) 1344 in which fixed instructions are stored. File storage subsystem 1350 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Input devices 1360 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1300.

Output devices 1370 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1300.

Network interface subsystem 1380 provides an interface to other computer systems, devices, and networks, such as communications network 1390. Network interface subsystem 1380 serves as an interface for receiving data from and transmitting data to other systems from computer system 1300. Some examples of communications network 1390 are private networks, public networks, leased lines, the Internet, Ethernet networks, token ring networks, fiber optic networks, and the like.

Computer system 1300 can be of various types including a personal computer, a portable computer, a workstation, a network computer, a mainframe, a kiosk, or any other data processing system. Due to the ever-changing nature of computers and networks, the description of computer system 1300 depicted in FIG. 13 is intended only as a specific example for purposes of illustrating the preferred embodiment of the computer system. Many other configurations having more or fewer components than the system depicted in FIG. 13 are possible.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for facilitating retrieval of pricing rules stored in a database, the method comprising:
    receiving, at one or more computer systems, information identifying a plurality of pricing rules stored in a database, at least some pricing rules in the plurality of pricing rules are configured to provide base prices for items and at least some pricing rules in the plurality of pricing rules are configured to modify the base prices for the items, each pricing rule in the plurality of pricing rules having an attribute-value structure;
    determining, with one or more processors associated with the one or more computer systems, an attribute group for each pricing rule in the plurality of pricing rules, the attribute group for a pricing rule incorporating a name of each of one or more attributes of the pricing rule;
    generating, with the one or more processors associated with the one or more computer systems, a mapping between each attribute group generated for each pricing rule in the plurality of pricing rules and at least one unique identifier;
    determining, with the one or more processors associated with the one or more computer systems, a data pattern for each pricing rule in the plurality of pricing rules, a data pattern of a pricing rule incorporating one or more values of one or more attributes of the pricing rule;
    generating, with the one or more processors associated with the one or more computer systems, a mapping between each data pattern generated for each pricing rule in the plurality of pricing rules and the unique identifier of at least one attribute group;
    receiving, at the one or more computer systems, a request for pricing information associated with an item;
    determining, with the one or more processors associated with the one or more computer systems, an attribute group for the request based on one or more attributes in the request for pricing information associated with the item, the attribute group for the request incorporating a name of each of one or more attributes in the request;
    determining, with the one or more processors associated with the one or more computer systems, a match between at least one attribute group determined for the plurality of pricing rules and the attribute group associated with the request;
    identifying, with the one or more processors associated with the one or more computer systems, a subset of the data patterns determined for the plurality of pricing rules that are associated with the unique identifier mapped to the matched at least one attribute group;
    determining, with the one or more processors associated with the one or more computer systems, a data pattern for the request based on one or more values of the one or more attributes in the request for pricing information associated with the item;
    identifying, with the one or more processors associated with the one or more computer systems, at least one pricing rule associated with at least one of the subset of data patterns based on a match between the determined data pattern associated with the request and at least one of the subset of data patterns; and
    generating, with the one or more processors associated with the one or more computer systems, information configured for retrieving the at least one identified pricing rule from the database.

2. The method of claim 1 wherein at least some of the pricing rules in the plurality of pricing rules are configured to provide payment terms for the items.

3. The method of claim 1 wherein receiving, at the one or more computer systems, the request for pricing information associated with the item comprises receiving a customer request from a vendor's website for a product.

4. The method of claim 1 wherein receiving, at the one or more computer systems, the request for pricing information associated with the item comprises receiving a purchase order.

5. The method of claim 1 wherein receiving, at the one or more computer systems, the request for pricing information associated with the item comprises receiving a customer proposal.

6. The method of claim 1 further comprising storing each attribute group and each data pattern in one or more tables of the database.

7. The method of claim 1 further comprising:
    generating, with the one or more processors associated with the one or more computer systems, pricing information for the item based on retrieving the at least one identified pricing rule from the database.

8. A non-transitory computer-readable medium storing computer-executable code for facilitating retrieval of pricing rules stored in a database, the non-transitory computer-readable medium comprising:

code for receiving information identifying a plurality of pricing rules stored in a database, at least some pricing rules in the plurality of pricing rules are configured to provide base prices for items and at least some pricing rules in the plurality of pricing rules are configured to modify the base prices for the items, each pricing rule in the plurality of pricing rules having an attribute-value structure;

code for determining an attribute group for each pricing rule in the plurality of pricing rules, the attribute group for a pricing rule incorporating a name of each of one or more attributes of the pricing rule;

code for generating a mapping between each attribute group generated for each pricing rule in the plurality of pricing rules and at least one unique identifier;

code for determining a data pattern for each pricing rule in the plurality of pricing rules, a data pattern of a pricing rule incorporating one or more values of one or more attributes of the pricing rule;

code for generating a mapping between each data pattern generated for each pricing rule in the plurality of pricing rules and the unique identifier of at least one attribute group;

code for receiving a request for pricing information associated with an item;

code for determining an attribute group for the request based on one or more attributes in the request for pricing information associated with the item, the attribute group for the request incorporating a name of each of one or more attributes in the request;

code for determining a match between at least one attribute group determined for the plurality of pricing rules and the attribute group associated with the request;

code for identifying a subset of the data patterns determined for the plurality of pricing rules that are associated with the unique identifier mapped to the matched at least one attribute group;

code for determining a data pattern for the request based on one or more values of the one or more attributes in the request for pricing information associated with the item;

code for identifying at least one pricing rule associated with at least one of the subset of data patterns based on a match between the determined data pattern associated with the request and at least one of the subset of data patterns; and code for generating information configured for retrieving the at least one identified pricing rule from the database.

9. The non-transitory computer-readable medium of claim 8 wherein at least some of the pricing rules in the plurality of pricing rules are configured to provide payment terms for the items.

10. The non-transitory computer-readable medium of claim 8 wherein the code for receiving the request for pricing information associated with the item comprises code for receiving a customer request from a vendor's website for a product.

11. The non-transitory computer-readable medium of claim 8 wherein the code for receiving the request for pricing information associated with the item comprises code for receiving a purchase order.

12. The non-transitory computer-readable medium of claim 8 wherein the code for receiving the request for pricing information associated with the item comprises code for receiving a customer proposal.

13. The non-transitory computer-readable medium of claim 8 further comprising code for storing each attribute group and each data pattern in one or more tables of the database.

14. The non-transitory computer-readable medium of claim 8 further comprising:

code for generating pricing information for the item based on retrieving the at least one identified pricing rule from the database.

15. A method for facilitating retrieval of entities stored in a database, the method comprising:

receiving, at one or more computer systems, a request identifying one or more attributes of objects sought to be retrieved from the database, each of the one or more attributes identified in the request having associated data;

determining, with one or more processors associated with the one or more computer systems, a first pattern corresponding to the request, the first pattern listing a name of one or more attributes identified in the request;

determining, with the one or more processors associated with the one or more computer systems, a second pattern corresponding to the request, the second pattern listing associated data of each of the one or more attributes identified in the request;

identifying, with the one or more processors associated with the one or more computer systems, a set of objects in the database based on the first pattern and the second pattern;

wherein a comparison is made first between the first pattern corresponding to the request and first patterns generated for the objects in the database from a name of each of one or more attributes of the objects to determine a unique identifier of at least one attribute group;

wherein a subset of second patterns generated for the objects in the database from one or more values of the one or more attributes of the objects are identified based on the unique identifier;

wherein a comparison is made second between the second pattern corresponding to the request and the subset of second patterns to determine at least one object in the database; and generating, with the one or more processors associated with the one or more computer systems, information configured to retrieve the one or more identified objects from the database.

16. The method of claim 15 further comprising:

grouping each object in the database into at least one of the first patterns; and generating the second patterns based on data associated with the one or more attributes of each object.

17. The method of claim 15 wherein identifying, with the one or more processors associated with the one or more computer systems, the set of objects in the database based on the first pattern and the second pattern comprises identifying a set of rules.

18. A non-transitory computer-readable medium storing computer-executable code for implementing the method of claim 15.

19. A non-transitory computer-readable medium storing computer-executable code for implementing the method of claim 16.

20. A non-transitory computer-readable medium storing computer-executable code for implementing the method of claim 17.

* * * * *

UNITED STATES PATENT AND TRADEMARK OFFICE
CERTIFICATE OF CORRECTION

PATENT NO.         : 8,204,905 B2
APPLICATION NO.    : 12/398396
DATED              : June 19, 2012
INVENTOR(S)        : Kuo et al.

Page 1 of 1

It is certified that error appears in the above-identified patent and that said Letters Patent is hereby corrected as shown below:

In column 10, line 42-52, delete "In step 635, an attribute group.................[SAFEWAY|2 NET]." and insert the same on Col. 10, Line 41, after "635." as a continuation of the same paragraph.

In column 12, line 3, delete "[NOTEBOOK|8% TARGET]," and insert
-- [NOTEBOOK|8%| TARGET], --, therefor.

Signed and Sealed this
Fourth Day of September, 2012

David J. Kappos
*Director of the United States Patent and Trademark Office*